UNITED STATES PATENT OFFICE.

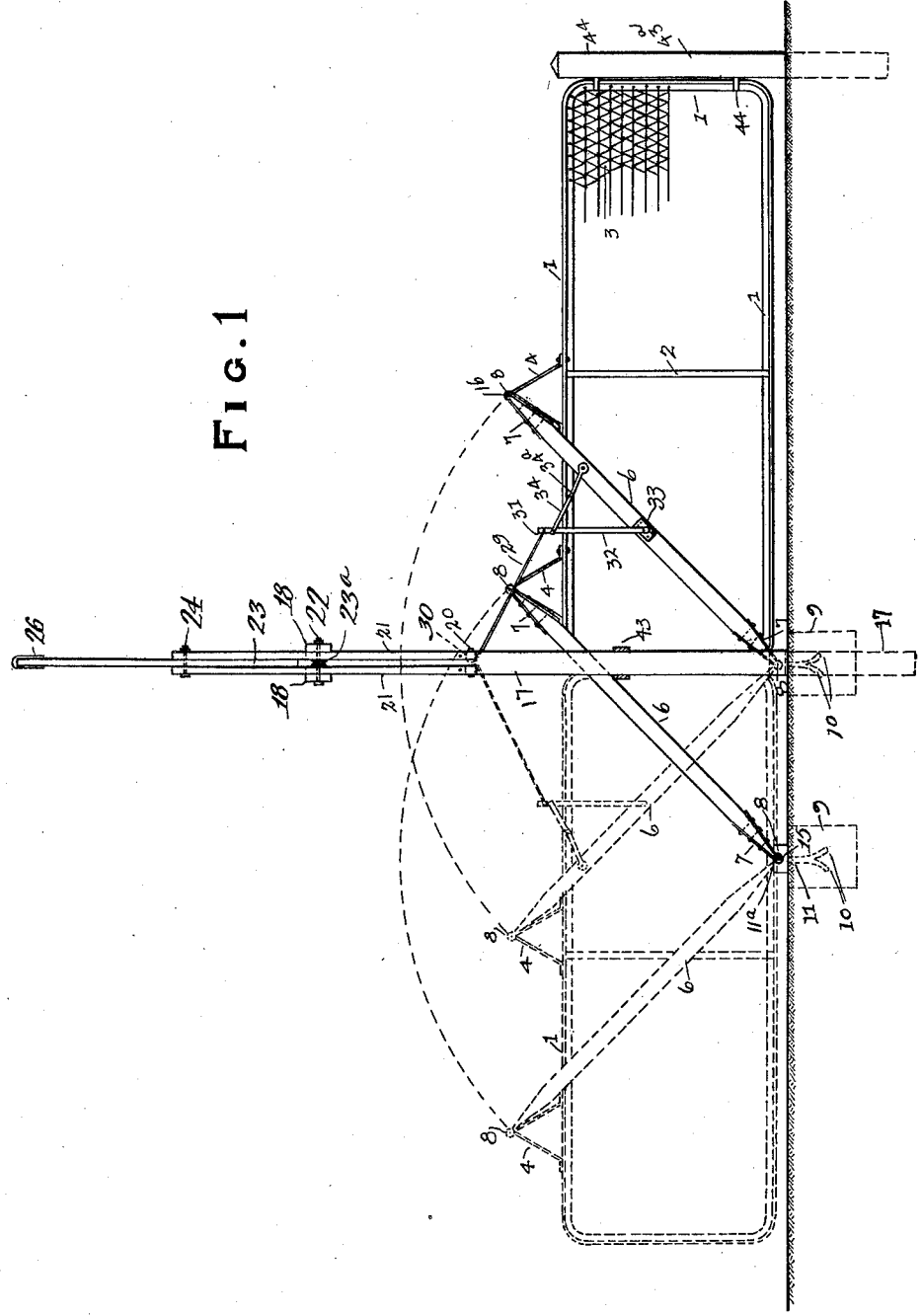

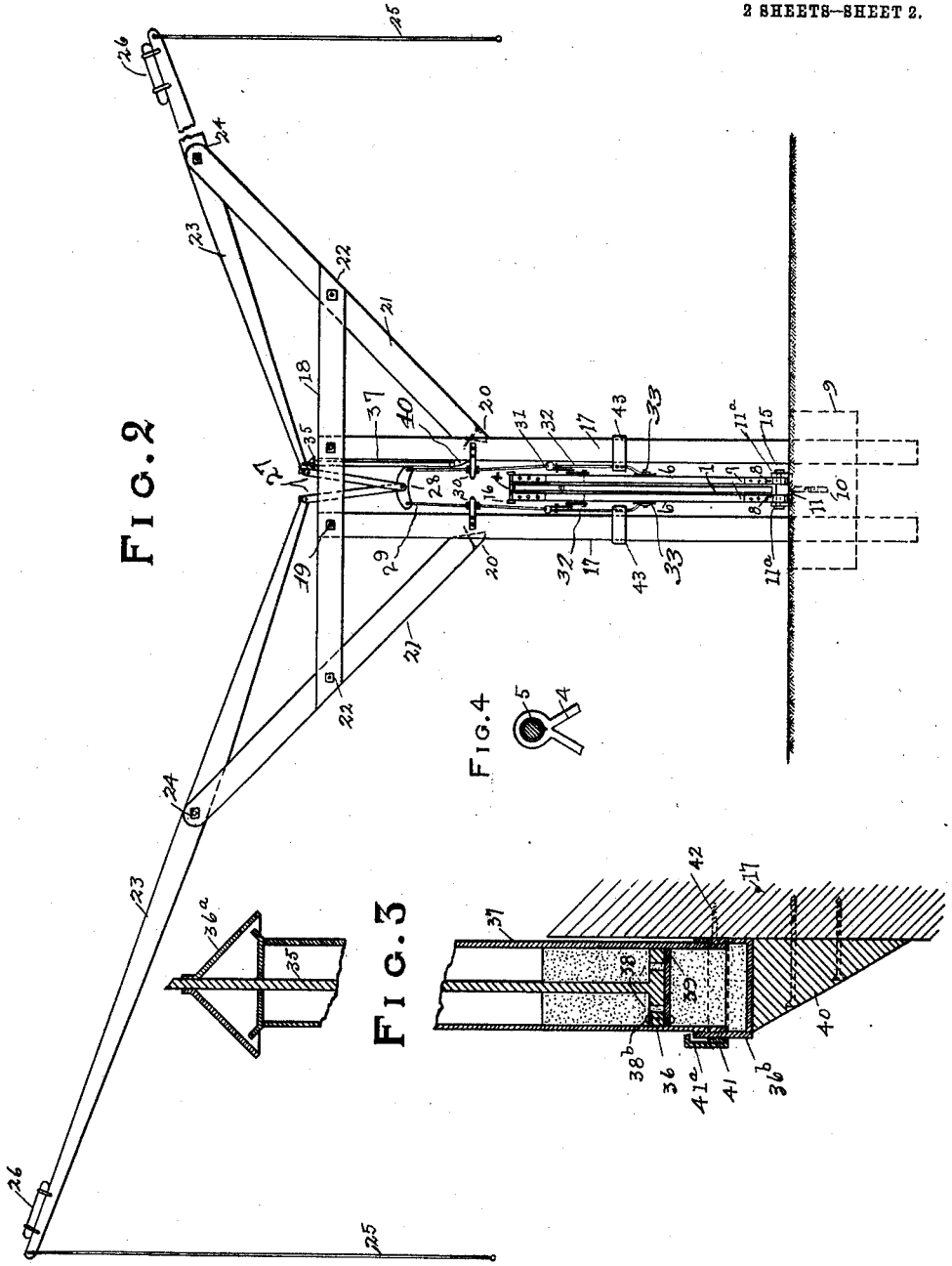
O. N. HUNTOSH & E. E. BONN.
FARM GATE.
APPLICATION FILED JUNE 21, 1910.
1,002,404.
Patented Sept. 5, 1911.
2 SHEETS—SHEET 2.

ORICK N. HUNTOSH AND EDWARD E. BONN, OF SEATTLE, WASHINGTON.

FARM-GATE.

1,002,404.  Specification of Letters Patent.  Patented Sept. 5, 1911.

Application filed June 21, 1910. Serial No. 568,220.

*To all whom it may concern:*

Be it known that we, ORICK N. HUNTOSH and EDWARD E. BONN, both citizens of the United States, and residents of Seattle, in the county of King and State of Washington, have invented certain new and useful Improvements in Farm-Gates, of which the following is a full, true, and exact specification.

The principal object of this invention is to provide a gate which may be easily opened and closed by the occupant of a vehicle, firmly braced and occupying but little space upon either side of the fence line, and which is effectually cushioned to avoid injurious shocks and damage to the gate in its operation.

Further objects will appear as the invention is more fully disclosed.

I attain these ends by the novel construction and combination of parts, as will be fully hereinafter described and claimed.

Referring to the drawings, Figure 1 is a front elevation of our improved gate, its open position being shown in dotted lines, and closed position in full lines. Fig. 2 is an end elevation. Fig. 3 is an enlarged detail view of the oil chamber and piston, in central longitudinal section. Fig. 4 is an enlarged fragmentary view of one of the hangers.

The gate itself consists of the frame 1, preferably of T iron, the upright central braces 2, and wire mesh 3 (a portion only of which is shown in the accompanying drawings) attached to the frame 1 in any suitable manner and extending over the entire area thereof. Secured to the upper portion of the frame 1 are the V shaped hangers 4, having the eyes 5 formed therein. On either side of the gate are the carrier arms 6, secured to each end of each of which are the straps 7, formed into the loops or eyes 8. Cement, or other suitable foundations are provided at 9, into which are anchored the prongs 10 of the castings 11, having the upstanding ears 11$^a$ bored to receive the bolt 15 which passes loosely through the loops 8 of the carrier arms 6, forming pivots therefor. The upper ends of the carrier arms 6 are connected to the hangers 4 by the bolts 16 which pass loosely through the loops 8 at the upper ends of the carrier arms 6 and through the eyes 5 of the hangers 4. The carrier arms 6 being of equal length, and the bolts 15 in a horizontal plane parallel to that of the bolts 16, it is evident that the gate will, at all times, be maintained in a horizontal position. Close to either side of the gate are the twin posts 17, having the cross arms 18 secured thereto by the bolts 19, and also having secured to their sides at 20 the spreaders 21, secured to the outer ends of the cross arm 18 by the bolts 22. The spreaders 21 are held apart by the spool 23$^a$, a distance equal to the thickness of the levers 23. The upper ends of the spreaders 21 and the levers 23 are bored to loosely receive the bolts 24, having suitable heads and nuts. Pendant from the outer ends of the levers 23 are the ropes 25, within easy reach of pedestrians. The levers 23 are provided with adjustable counterbalances 26. Pivoted to the inner ends of the levers 23 are the metal straps 27, which are pivotally connected to the balancing piece 28, to the outer ends of which are connected the ends of the ropes 29, preferably of wire, which pass downwardly to and around the pulleys 30, and thence to the point 31, where they are attached to the upper ends of the metal strap 32. The opposite ends of the straps 32 are loosely connected at 33 to the forward pair of the carrier arms 6, the metal straps 34, loosely jointed at 34$^a$, loosely connect the upper ends of the straps 32 to the same pair of the carrier arms 6. To the inner end of one of the levers 23 is attached the piston rod 35, having the head 36 of slightly smaller diameter than the internal diameter of the oil chamber 37, and having the slanting roof 36$^a$, for the oil chamber 37. The screw cap 36$^b$ is fitted to and forms the bottom of the oil chamber 37. The piston head 36 is perforated at 38, and has attached thereto, by means of the pin 38$^b$, the leather flap 39, of equal diameter with the head 36. 40 is a bracket secured to the post 17, and upon which rests the oil chamber 37. 41 is a metal strap looped around the oil chamber 37 and having its ends secured to the post 17 by the screws 42. The loop formed by the strap 41 is larger than the outer diameter of the bottom of the oil chamber 37, which permits of some slight rocking of the latter upon its bracket, so that if the piston rod 35 be drawn upwardly but out of the perpendicular, the oil chamber will incline in the same direction without cramping the parts. Extending upwardly from the strap 41 is the hooked finger 41$^a$, which prevents any considerable displacement of the oil chamber 37 when the piston is drawn upwardly.

It is evident that the piston head 36 has a comparatively free movement upwardly, the oil passing freely through the apertures 38 and meeting with but little resistance from the flap 39 which is supported at but one point (38$^b$) during its upward movement; while during the downward movement the flap 39 is forced against the head 36 and closes the apertures 38, the combined area of which is greater than that of the comparatively small space between the inner surface of the oil chamber 37 and the periphery of the head 36 and the flap 39, through which the oil escapes from the portion of the oil chamber below the head 36 into the upper portion thereof, during the down stroke.

Upon the posts 17 are secured the extensions 43, so positioned as to be out of the path of the strap 32 during the travel of the gate, and which form substantial lateral braces for the gate in its closed position. To the right of the posts 17 a distance equal to the length of the gate is planted the post 43$^a$ having the fingers 44 which embrace the end of the gate on either side and hold the same against lateral movement when closed.

From the above it is evident that a downward pull upon the rope 25 will cause the lever 23 to swing about its pivot 24, elevating its inner end, drawing with it the straps 27 and balancing piece 28 to which are attached the ropes 29, which, through their connections with the carrier arms 6, cause the same to swing upon their pivots 15 and raise the gate from its closed position, finally depositing the same in its open position; and manifestly, the same operation will change the gate from its open to its closed position. During the operation just described it is clear that during the first half or upward movement of the gate comparatively little resistance is offered by the piston head 36 (which, of course, rises and falls with the gate) the apertures 38 being open, as already shown, while the last half, or downward movement of the gate is comparatively slow, the apertures 38 being closed.

When the rope 25 is pulled downwardly, the power thus applied is transmitted through the intervening mechanism to the carrier arms 6 at a point substantially where the strap 34 joins the carrier arm, being a considerable distance from its pivot bolt 15 and affording the maximum leverage in overcoming the inertia of the gate at the beginning of the pull. As the gate ascends and gathers momentum this leverage decreases as the strap 32 gradually swings toward the post 17 and finally reaches a substantially straight line between the joint 33 and the pulley 20, the parts forming the strap 34 having folded together, which arrangement results in a practically even pull in opening or closing the gate.

While we have shown a particular embodiment of our invention, we are fully aware that many changes may be made therein by others skilled in the art, without departing from the spirit and scope thereof, and we do not, therefore, desire to be limited to the exact form of embodiment herein shown.

What we claim as new is:—

A gate having oscillatory carrier arms, a frame through which the gate reciprocates, operating levers pivoted upon said frame, connections between said operating levers and said carrier arms, said connections including an upper flexible section and a lower foldable section attached to said carrier arms at a higher and a lower point; pulleys over which said flexible sections run, said pulleys being mounted upon said frame in a plane near the point of attachment of the lower ends of said connections, whereby the pull upon the operating levers is equalized and cramping of the same prevented.

ORICK N. HUNTOSH.
EDWARD E. BONN.

Witnesses:
L. J. GORIN,
J. H. BARBER.

---

Copies of this patent may be obtained for five cents each, by addressing the "Commissioner of Patents, Washington, D. C."